United States Patent
Huang

(10) Patent No.: US 10,209,484 B2
(45) Date of Patent: *Feb. 19, 2019

(54) PHOTOGRAPHING LENS SYSTEM, IMAGE CAPTURING DEVICE, AND ELECTRONIC DEVICE

(71) Applicant: Largan Precision Co., Ltd., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,125

(22) Filed: Jul. 21, 2017

(65) Prior Publication Data

US 2017/0322390 A1    Nov. 9, 2017

Related U.S. Application Data

(63) Continuation of application No. 14/813,517, filed on Jul. 30, 2015, now Pat. No. 9,753,247.

(30) Foreign Application Priority Data

May 28, 2015 (TW) .............................. 104117216 A

(51) Int. Cl.
　　*G02B 13/18*　　(2006.01)
　　*G02B 9/34*　　(2006.01)
　　*G02B 13/00*　　(2006.01)

(52) U.S. Cl.
　　CPC .............. *G02B 9/34* (2013.01); *G02B 13/004* (2013.01)

(58) Field of Classification Search
　　CPC . G02B 9/00; G02B 9/34; G02B 13/00; G02B 13/001; G02B 13/0015; G02B 13/004
　　See application file for complete search history.

(56) References Cited

U.S. PATENT DOCUMENTS

| 2,762,262 A | 9/1956 | Bertele |
| 2,819,652 A | 1/1958 | Baur et al. |

(Continued)

FOREIGN PATENT DOCUMENTS

| CN | 201383029 Y | 1/2010 |
| JP | S54017835 A | 2/1979 |

(Continued)

*Primary Examiner* — Thong Nguyen
(74) *Attorney, Agent, or Firm* — Chun-Ming Shih; HDLS IPR Services

(57) ABSTRACT

A photographing lens system includes, in order from an object side to an image side, a first lens element, a second lens element, a third lens element, and a fourth lens element. The first lens element has positive refractive power. The second lens element has negative refractive power. The third lens element having positive refractive power has an image-side surface being concave, and an object-side surface and the image-side surface thereof being aspheric. The fourth lens element has an object-side surface being concave, and the object-side surface and an image-side surface thereof being aspheric. The photographing lens system further includes an aperture stop, and no lens elements are disposed between the aperture stop and the first lens element. The photographing lens system has a total of four lens elements.

23 Claims, 10 Drawing Sheets

(56) References Cited

U.S. PATENT DOCUMENTS

| | | | |
|---|---|---|---|
| 2,929,297 A | 3/1960 | Lautenbacher | |
| 3,840,289 A | 10/1974 | Day | |
| 4,161,350 A | 7/1979 | Arai | |
| 7,549,809 B2* | 6/2009 | Isono | G02B 9/34 359/686 |
| 7,643,225 B1* | 1/2010 | Tsai | G02B 9/34 359/715 |
| 8,314,999 B1* | 11/2012 | Tsai | G02B 13/004 359/715 |
| 9,753,247 B2* | 9/2017 | Huang | G02B 13/004 |
| 2010/0165483 A1* | 7/2010 | Tang | G02B 13/22 359/715 |
| 2011/0188133 A1* | 8/2011 | Yamakawa | G02B 13/004 359/715 |
| 2015/0370039 A1 | 12/2015 | Bone | |

FOREIGN PATENT DOCUMENTS

| | | |
|---|---|---|
| JP | H04278910 A | 10/1992 |
| JP | H11160624 A | 6/1999 |
| JP | 2009-098513 A | 5/2009 |
| JP | 2009-098514 A | 5/2009 |
| JP | 2009-098515 A | 5/2009 |
| JP | 2009-098516 A | 5/2009 |

\* cited by examiner

PHOTOGRAPHING LENS SYSTEM, IMAGE CAPTURING DEVICE, AND ELECTRONIC DEVICE

RELATED APPLICATIONS

This application is a continuation application of U.S. application Ser. No. 14/813,517 filed on Jul. 30, 2015, now U.S. Pat. No. 9,753,247, which claims priority to Taiwan Application No. 104117216 filed on May 28, 2015. The entire disclosure of which is incorporated by reference herein.

BACKGROUND OF THE INVENTION

Field of the Invention

The present disclosure relates to a photographing lens system and an image capturing device. More particularly, the present disclosure relates to a compact photographing lens system and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure, however, the allocation of the refractive powers of the optical system results in difficulty to control the size thereof, and it is hard to make a balance between the image quality of center image and that of peripheral image.

SUMMARY OF THE INVENTION

According to one aspect of the present disclosure, a photographing lens system includes, in order from an object side to an image side, a first lens element, a second lens element, a third lens element, and a fourth lens element. The first lens element has positive refractive power. The second lens element has negative refractive power. The third lens element has positive refractive power and an image-side surface being concave, wherein an object-side surface and the image-side surface of the third lens element are aspheric. The fourth lens element has an object-side surface being concave, wherein the object-side surface and an image-side surface of the fourth lens element are both aspheric. The photographing lens system further includes an aperture stop, and no lens elements are disposed between the aperture stop and the first lens element. The photographing lens system has a total of four lens elements, and there is an air gap between every two of the first lens element, the second lens element, the third lens element, and the fourth lens element that are adjacent to each other. When a curvature radius of the image-side surface of the third lens element is R6, a curvature radius of the object-side surface of the fourth lens element is R7, a central thickness of the fourth lens element is CT4, an axial distance between the first lens element and the second lens element is T12, an axial distance between the second lens element and the third lens element is T23, an axial distance between the third lens element and the fourth lens element is T34, an axial distance between the aperture stop and the image-side surface of the fourth lens element is SD, and an axial distance between the object-side surface of the first lens element and the image-side surface of the fourth lens element is TD, the following conditions are satisfied:

$-1.0 < (R6+R7)/(R6-R7) < 1.0;$ $0 < T34/(T12+T23) < 1.0;$ $0 < T34/CT4 < 2.0;$ and $0.75 < SD/TD < 1.20.$ According to another aspect of the present disclosure, an image capturing device includes the photographing lens system according to the aforementioned aspect and an image sensor, wherein the image sensor is located at the image side of the photographing lens system.

According to further another aspect of the present disclosure, an electronic device includes the image capturing device according to the aforementioned aspect.

According to yet another aspect of the present disclosure, a photographing lens system includes, in order from an object side to an image side, a first lens element, a second lens element, a third lens element, and a fourth lens element. The first lens element has positive refractive power. The second lens element has negative refractive power. The third lens element has an image-side surface being concave, wherein an object-side surface and the image-side surface of the third lens element are aspheric. The fourth lens element has negative refractive power and an object-side surface being concave, wherein the object-side surface and an image-side surface of the fourth lens element are aspheric. The photographing lens system further includes an aperture stop, and no lens elements are disposed between the aperture stop and the first lens element. The photographing lens system has a total of four lens elements with reflective power, and there is an air gap between every two of the first lens element, the second lens element, the third lens element, and the fourth lens element that are adjacent to each other. When a focal length of the first lens element is f1, a focal length of the third lens element is f3, a curvature radius of the image-side surface of the third lens element is R6, a curvature radius of the object-side surface of the fourth lens element is R7, a central thickness of the fourth lens element is CT4, an axial distance between the first lens element and the second lens element is T12, an axial distance between the second lens element and the third lens element is T23, an axial distance between the third lens element and the fourth lens element is T34, an axial distance between the aperture stop and the image-side surface of the fourth lens element is SD, and an axial distance between the object-side surface of the first lens element and the image-side surface of the fourth lens element is TD, the following conditions are satisfied:

$-1.0 < (R6+R7)/(R6-R7) < 1.0;$ $0 < T34/(T12+T23) < 1.0;$ $0 < T34/CT4 < 2.0;$ $0.75 < SD/TD < 1.20;$ and $|f3/f1| < 8.0.$

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
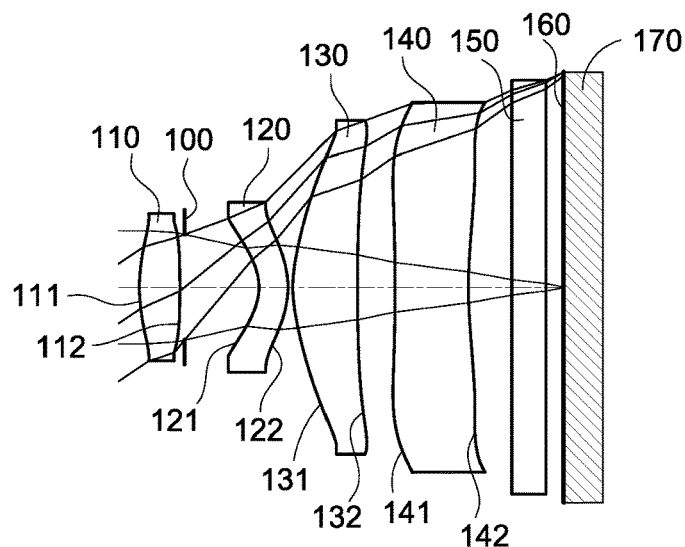
FIG. 1 is a schematic view of an image capturing device according to the 1st embodiment of the present disclosure.

A photographing lens system includes, form an object side to an image side, a first lens element, a second lens element, a third lens element, and a fourth lens element. The photographing lens system has a total of four lens elements.

According to the photographing lens system of the present disclosure, there is an air gap between every two of the first lens element, the second lens element, the third lens element, and the fourth lens element that are adjacent to each other. In other words, the first to fourth lens elements are four independent and non-cemented lens elements. The manufacturing process of the cemented lens element is more complex than that of the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing lens system. Therefore, according to the photographing lens system of the present disclosure, the first lens element, the second lens element, the third lens element, and the fourth lens element are independent and non-cemented lens elements for improving the problem generated by the cemented lens elements.

The first lens element having positive refractive power has an object-side surface being convex. Therefore, the refractive power centers on the object side of the photographing lens system for making the photographing lens system more compact and portable.

The second lens element having negative refractive power. Therefore, the aberration of the photographing lens system can be corrected. Moreover, at least one of an object-side surface and an image-side surface of the second lens element has at least one inflection point, so that it is favorable for effectively reducing the incident angle of light projecting onto an image sensor so as to increase the responding efficiency of the image sensor.

The third lens element having positive refractive power has an image-side surface being concave, and an object-side surface and the image-side surface thereof are both aspheric. It is favorable for alleviating convergence of the third lens element so as to improve the resolution of peripheral image. Moreover, at least one of the object-side surface and the image-side surface of the third lens element has at least one inflection point, so that it is favorable for effectively reducing the incident angle of light projecting onto the image sensor so as to increase the responding efficiency of the image sensor.

The fourth lens element having negative refractive power has an object-side surface being concave, and the object-side surface and an image-side surface thereof being both aspheric. The image-side surface of the fourth lens element can be concave. Therefore, incident angle of paraxial light projecting onto the fourth lens element is nearly perpendicular to the surface thereof, so that the center image quality can be improved. Moreover, the fourth lens element can have at least one inflection point on at least one of the object-side surface and the image-side surface. Therefore, the aberration of the off-axis can be further corrected.

According to the photographing lens system of the present disclosure, the photographing lens system can include at least one stop, such as an aperture stop, a glare stop or a field stop. Said glare stop or said field stop is for eliminating the stray light and thereby improving the image resolution thereof.

According to the photographing lens system of the present disclosure, the aperture stop can be configured as a front stop or a middle stop. A front stop disposed between an imaged object and the first lens element can provide a longer distance between an exit pupil of the photographing lens system and the image surface and thereby improves the image-sensing efficiency of an image sensor. A middle stop disposed between the first lens element and the image surface is favorable for enlarging the field of view of the photographing lens system and thereby provides a wider field of view for the same.

When a curvature radius of the image-side surface of the third lens element is R6, a curvature radius of the object-side surface of the fourth lens element is R7, and the following condition is satisfied: −0.1<(R6+R7)/(R6−R7)<1.0. Therefore, the incident angle and emitting angle of paraxial light projecting onto the surfaces of the lens elements are alleviated and total-internal-reflection generated by over incident angle and emitting angle is prevented, thus the stray light projecting onto the image surface can be eliminated. Preferably, the following condition is satisfied: −0.80<(R6+R7)/(R6−R7)<0.80.

When an axial distance between the first lens element and the second lens element is T12, an axial distance between the second lens element and the third lens element is T23, an axial distance between the third lens element and the fourth lens element is T34, and the following condition is satisfied: 0<T34/(T12+T23)<1.0. Preferably, the following condition is satisfied: 0<T34/(T12+T23)<0.80. Therefore, the ability for adjusting optical path can be provided and makes the photographing lens system has better assembling ability since the object side of the photographing lens system has sufficient space allocation.

When the axial distance between the third lens element and the fourth lens element is T34, a central distance of the fourth lens element is CT4, and the following condition is satisfied: 0<T34/CT4<2.0. Therefore, the sufficient space allocation between the third lens element and the fourth lens elements is favorable for manufacturing and assembling the photographing lens system and improving the manufacturing yield rate thereof. Preferably, the following condition is satisfied: 0<T34/CT4<1.20.

When an axial distance between the aperture stop and the image-side surface of the fourth lens element is SD, an axial distance between the object-side surface of the first lens element and the image-side surface of the fourth lens element is TD, and the following condition is satisfied: 0.75<SD/TD<1.20. Therefore, it is favorable for making a balance between telecentric characteristic and wide-viewing angle. Preferably, the following condition is satisfied: 0.80<SD/TD<0.95.

When a focal length of the first lens element is f1, a focal length of the third lens element is f3, and the following condition is satisfied: |f3/f1|<8.0. Therefore, the refractive power between the first lens element and the third lens element is proper, so that the refractive power of the photographing lens system can be centered on the object side thereof. Preferably, the following condition is satisfied: |f3/f1|<5.0.

When an Abbe number of the second lens element is V2, the following condition is satisfied: V2<27.0. Therefore, the chromatic aberration of the photographing lens system can be corrected. When a curvature radius of the object-side surface of the first lens element is R1, a curvature radius of the image-side surface of the first lens element is R2, and the following condition is satisfied: −1.50<(R1+R2)/(R1−R2)<1.0. Therefore, the refractive power of the first lens element is proper, so that spherical aberration can be eliminated.

When the focal length of the third lens element is f3, a focal length of the fourth lens element is f4, and the following condition is satisfied: −1.0<f3/f4<1.0. Therefore, the aberration generated from the photographing lens system can be eliminated, and image quality of the photographing lens system is then improved.

When a curvature radius of the object-side surface of the second lens element is R3, a curvature radius of the image-side surface of the second lens element is R4, and the following condition is satisfied: −0.50<(R3−R4)/(R3+R4)<0.65. Therefore, the aberration can be further corrected, so that the image quality of the photographing lens system can be improved.

When the focal length of the third lens element is f3, a focal length of the photographing lens system is f, and the following condition is satisfied: 0.40<f3/f<1.50. Therefore, the refractive power of the third lens element is effectively controlled, so that sensitivity of the photographing lens system can be reduced.

When a curvature radius of the object-side surface of the third lens element is R5, the curvature radius of the image-side surface of the third lens element is R6, and the following condition is satisfied: 0<R5/R6<0.50. Therefore, the refractive power of the third lens element is proper, so that sensitivity of the photographing lens system can be reduced.

When a curvature radius of the image-side surface of the fourth lens element is R8, the focal length of the photographing lens system is f, and the following condition is satisfied: |R8/f|<3.0. Therefore, the aberration can be further corrected to make the photographing lens system having an applicable back focal length.

When the axial distance between the first lens element and the second lens element is T12, the axial distance between the second lens element and the third lens element is T23, the axial distance between the third lens element and the fourth lens element is T34, and the following conditions are satisfied: T23<T12 and T34<T12. Therefore, the ability for adjusting optical path can be provided since the object side of the photographing lens system has sufficient space allocation.

When the axial distance between the first lens element and the second lens element is T12, a central thickness of the second lens element is CT2, and the following condition is satisfied: 1.0<T12/CT2<5.0. Therefore, the photographing lens system is favorable for assembling since sufficient space between the first lens element and the second lens element.

When a maximum effective radius of the image-side surface of the second lens element is SD22, and a maximum effective radius of the object-side surface of the third lens element is SD31, the following condition is satisfied: 1.40<SD31/SD22<2.50. Therefore, wide-viewing angle and larger image size can be obtained while the photographing lens system has finite track length, thus the area of incident light projecting onto the image sensor can be increased and image brightness can be enhanced.

According to the photographing lens system of the present disclosure, the lens elements thereof can be made of glass or plastic material. When the lens elements are made of glass material, the distribution of the refractive powers of the photographing lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens system can also be reduced.

According to the photographing lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing lens system of the present disclosure, the positive refractive power or the negative refractive power of a lens element or the focal length of the lens element, that is, refers to the refractive power or the focal length in a paraxial region of the lens element.

According to the photographing lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing lens system of the present disclosure, an image surface of the photographing lens system, based on the corresponding image sensor, can be flat or curved. For instance, the image surface can be a curved surface being concave facing towards the object side.

According to the photographing lens system of the present disclosure, the photographing lens system can be optionally applied to moving focus optical systems, and is featured with good ability for correcting aberration and high image quality. The photographing lens system of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned photographing lens system and an image sensor. The image sensor is located at the image side of the photographing lens system. In the present disclosure, convergence of the photographing lens system centers on the object side thereof since the first lens element has positive refractive power, so that the photographing lens system is more compact and portable. The second lens element with designable negative refractive power can effectively correct aberration generated of the photographing lens system. The third lens element has the image-side surface being concave can alleviate convergence thereof, so that the resolution of peripheral image can be enhanced. The fourth lens element has the object-side surface being concave makes the incident angle of paraxial light projecting onto the fourth lens element be nearly perpendicular to the surface thereof, so that the center image quality can be improved. Preferably, the image capturing device can further include a barrel member, a holding member or a combination thereof.

According to the present disclosure, an electronic device is provided. The electronic device includes the aforementioned image capturing device. Therefore, the image sharpness can be enhanced while the compact size of the electronic device is maintained. Preferably, the electronic device can further include but not limited to a control unit, a display, a storage unit, a random access memory unit (RAM), a read only memory unit (ROM) or a combination thereof.

According to the above description of the present disclosure, the following 1st-11th specific embodiments are provided for further explanation.

1st Embodiment

Figure 2:
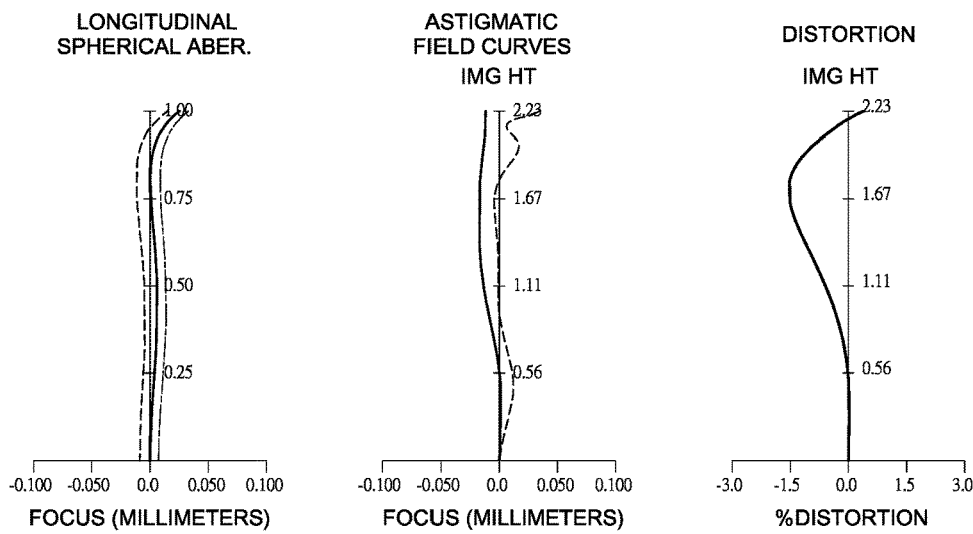
FIG. 2 shows spherical aberration curves, astigmatic field curves, and a distortion curve of the image capturing device according to the 1st embodiment.

FIG. 1 is a schematic view of an image capturing device according to 1st embodiment of the present disclosure. FIG. 2 shows spherical aberration curves, astigmatic field curves, and a distortion curve of the image capturing device according to the 1st embodiment. In FIG. 1, the image capturing device includes a photographing lens system (its reference numeral is omitted) and an image sensor 170. The photographing lens system includes, in order from an object side to an image side, a first lens element 110, an aperture stop 100, a second lens element 120, a third lens element 130, a fourth lens element 140, an IR-filter 150, and an image surface 160, wherein the image sensor 170 is located at the image side of the photographing lens system. The photographing lens system has a total of four lens elements (110, 120, 130 and 140), and there is an air gap in a paraxial region between every two of the first lens element 110, the second lens element 120, the third lens element 130, and the fourth lens element 140 that are adjacent to each other.

The first lens element 110 having positive refractive power has an object-side surface 111 being convex and an image-side surface 112 being convex. The first lens element 110 is made of plastic material and has the object-side surface 111 and the image-side surface 112 being both aspheric.

The second lens element 120 having negative refractive power has an object-side surface 121 being concave and an image-side surface 122 being convex. The second lens element 120 is made of plastic material and has the object-side surface 121 and the image-side surface 122 being both aspheric, wherein both of the object-side surface 121 and the image-side surface 122 of the second lens element 120 have inflection point thereon.

The third lens element 130 having positive refractive power has an object-side surface 131 being convex and an image-side surface 132 being concave. The third lens element 130 is made of plastic material and has the object-side surface 131 and the image-side surface 132 being both aspheric, wherein both of the object-side surface 131 and the image-side surface 132 of the third lens element 130 have inflection point thereon.

The fourth lens element 140 having negative refractive power has an object-side surface 141 being concave and an image-side surface 142 being concave. The fourth lens element 140 is made of plastic material and has the object-side surface 141 and the image-side surface 142 being both aspheric, wherein both of the object-side surface 141 and the image-side surface 142 of the fourth lens element 140 have inflection point thereon.

The IR-filter 150 is made of glass material and is located between the fourth lens element 140 and the image surface 160, and will not affect a focal length of the photographing lens system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing lens system according to the 1st embodiment, a focal length of the photographing lens system is f, an F-number of the photographing lens system is Fno, and a half of a maximum field of view is HFOV, these parameters have the following values: f=3.29 mm; Fno=2.80; and HFOV=34.0 degrees.

In the photographing lens system according to the 1st embodiment, when an Abbe number of the second lens element 120 is V2, the following condition is satisfied: V2=21.4.

In the photographing lens system according to the 1st embodiment, when an axial distance between the first lens element 110 and the second lens element 120 is T12, and a central thickness of the second lens element 120 is CT2, the following condition is satisfied: T12/CT2=2.74. In the photographing lens system according to the 1st embodiment, when an axial distance between the third lens element 130 and the fourth lens element 140 is T34, and a central thickness of the fourth lens element 140 is CT4, the following condition is satisfied: T34/CT4=0.51.

In the photographing lens system according to the 1st embodiment, when the axial distance between the first lens element 110 and the second lens element is T12, an axial distance between the second lens element 120 and the third lens element 130 is T23, and the axial distance between the third lens element 130 and the fourth lens element 140 is T34, the following condition is satisfied: T34/(T12+T23)=0.45.

In the photographing lens system according to the 1st embodiment, when a curvature radius of the object-side surface 111 of the first lens element 110 is R1, and a curvature radius of the image-side surface 112 of the first lens element 110 is R2, the following condition is satisfied: (R1+R2)/(R1−R2)=−0.77.

In the photographing lens system according to the 1st embodiment, a curvature radius of the object-side surface 121 of the second lens element 120 is R3, and a curvature radius of the image-surface 122 of the second lens element 120 is R4, the following condition is satisfied: (R3−R4)/(R3+R4)=−0.27.

In the photographing lens system according to the 1st embodiment, when a curvature radius of the image-side surface 132 of the third lens element 130 is R6, and a curvature radius of the object-side surface 141 of the fourth lens element 140 is R7, the following condition is satisfied: (R6+R7)/(R6−R7)=−0.17.

In the photographing lens system according to the 1st embodiment, when a curvature radius of the image-side surface 142 of the fourth lens element 140 is R8, and the focal length of the photographing lens system is f, the following condition is satisfied: |R8/f|=1.48.

In the photographing lens system according to the 1st embodiment, when a curvature radius of the object-side surface 131 of the third lens element 130 is R5, and the curvature radius of the image-side surface 132 of the third lens element 130 is R6, the following condition is satisfied: R5/R6=0.07.

In the photographing lens system according to the 1st embodiment, when a focal length of the third lens element 130 is f3, and the focal length of the photographing lens system is f, the following condition is satisfied: f3/f=0.79.

In the photographing lens system according to the 1st embodiment, when a focal length of the first lens element 110 is f1, and the focal length of the third lens element 130 is f3, the following condition is satisfied: |f3/f1|=0.87.

In the photographing lens system according to the 1st embodiment, when the focal length of the third lens element 130 is f3, and a focal length of the fourth lens element is f4, the following condition is satisfied: f3/f4=−0.35.

In the photographing lens system according to the 1st embodiment, when an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following condition is satisfied: SD/TD=0.86.

In the photographing lens system according to the 1st embodiment, when a maximum effective radius of the image-side surface 122 of the second lens element 120 is SD22, and a maximum effective radius of the object-side surface 131 of the third lens element 130 is SD31, the following condition is satisfied: SD31/SD22=1.83.

The detail optical data of the 1st embodiment are shown in Table 1 and the aspheric surface data are shown in Table 2 below.

TABLE 1

1st Embodiment
f = 3.29 mm, Fno = 2.80, HFOV = 34.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.827 | ASP | 0.420 | Plastic | 1.544 | 55.9 | 3.00 |
| 2 | | −14.183 | ASP | 0.050 | | | | |
| 3 | Ape. Stop | Plano | | 0.772 | | | | |
| 4 | Lens 2 | −0.563 | ASP | 0.300 | Plastic | 1.650 | 21.4 | −2.86 |
| 5 | | −0.978 | ASP | 0.050 | | | | |
| 6 | Lens 3 | 1.341 | ASP | 0.665 | Plastic | 1.544 | 55.9 | 2.62 |
| 7 | | 18.822 | ASP | 0.391 | | | | |

TABLE 1-continued

1st Embodiment
f = 3.29 mm, Fno = 2.80, HFOV = 34.0 deg.

| Surface # | | Curvature Radius | | Thickness | Material | Index | Abbe # | Focal Length |
|---|---|---|---|---|---|---|---|---|
| 8 | Lens 4 | −26.455 | ASP | 0.762 | Plastic | 1.544 | 55.9 | −7.51 |
| 9 | | 4.879 | ASP | 0.450 | | | | |
| 10 | IR-filter | Plano | | 0.353 | Glass | 1.517 | 64.2 | — |
| 11 | | Plano | | 0.186 | | | | |
| 12 | Image | Plano | | — | | | | |

Note:
Reference wavelength is 587.6 nm (d-line).

TABLE 2

Aspheric Coefficients

| Surface # | 1 | 2 | 4 | 5 |
|---|---|---|---|---|
| k = | −1.4349E+00 | −4.9676E+01 | −2.8619E+00 | −1.1841E+00 |
| A4 = | −4.8999E−02 | −1.3794E−01 | −4.3410E−01 | 1.2647E−02 |
| A6 = | −9.6766E−02 | −1.3321E−01 | 4.3635E−01 | 2.2574E−01 |
| A8 = | −1.0013E−01 | −1.3062E−01 | 1.9712E+00 | 2.5592E−01 |
| A10 = | −1.8964E−01 | 1.7460E−01 | −1.6552E+00 | 8.5356E−02 |
| A12 = | | | −5.6713E+00 | −3.2475E−01 |
| A14 = | | | 6.8558E+00 | −3.6369E−01 |
| A16 = | | | 4.4716E−02 | 4.0686E−01 |

| Surface # | 6 | 7 | 8 | 9 |
|---|---|---|---|---|
| k = | −1.3652E+01 | 6.6366E−02 | 5.0000E+01 | 2.3606E−01 |
| A4 = | 1.6924E−02 | −1.1390E−03 | −1.2940E−02 | −5.4900E−02 |
| A6 = | 4.0959E−03 | 4.1976E−03 | 1.0384E−02 | 1.0027E−02 |
| A8 = | −2.6179E−03 | 2.5558E−04 | 1.0794E−03 | −7.9585E−04 |
| A10 = | −4.0356E−04 | −5.6569E−05 | −1.5201E−04 | 6.8378E−05 |
| A12 = | 2.6901E−04 | −5.7465E−05 | −8.3774E−05 | 6.7903E−05 |
| A14 = | 1.1454E−04 | −2.2894E−05 | −1.5488E−05 | 1.2106E−05 |
| A16 = | −5.2767E−05 | −2.7941E−06 | 5.0178E−06 | −4.7160E−06 |

In Table 1, the curvature radius, the thickness, and the focal length are shown in millimeter (mm). Surface numbers 0-12 represent the surfaces sequentially arranged from the object-side to the image-side along the optical axis. In Table 2, k represents the conic coefficient of the equation of the aspheric surface profiles. A4, A6, A8, A10, A12, A14 and A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
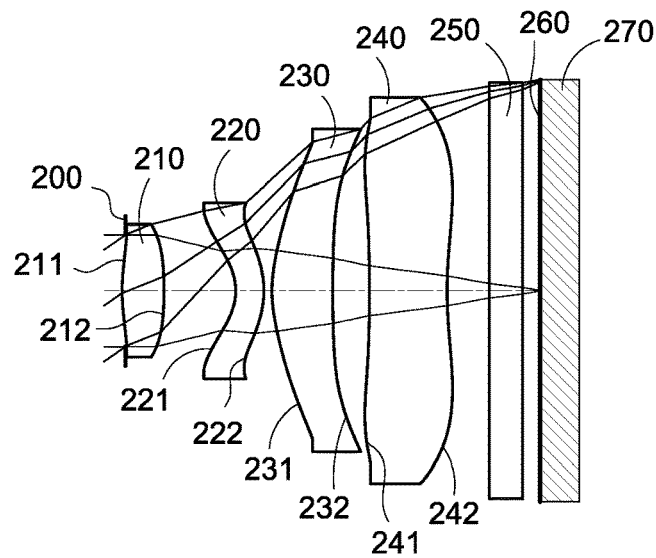
FIG. 3 is a schematic view of an image capturing device according to the 2nd embodiment of the present disclosure.
Figure 4:
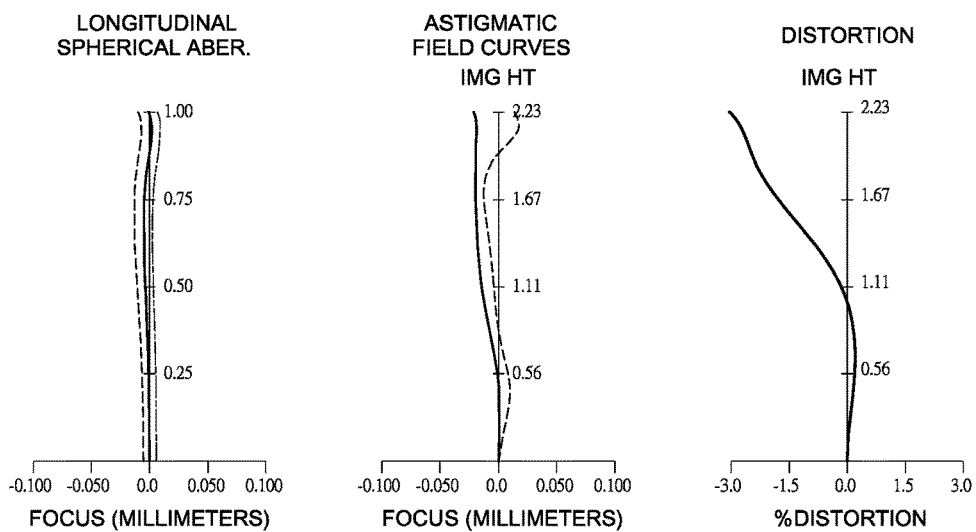
FIG. 4 shows spherical aberration curves, astigmatic field curves, and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves, and a distortion curve of the image capturing device according to the 2nd embodiment. In FIG. 3, the image capturing device includes a photographing lens system (its reference numeral in omitted) and an image sensor 270. The photographing lens system includes, in order from an object side to an image side, an aperture stop 200, a first lens element 210, a second lens element 220, a third lens element 230, a fourth lens element 240, an IR-filter 250, and an image surface 260, wherein the image sensor 270 is located at the image surface 260 of the photographing lens system.

The photographing lens system has a total of four lens elements (210, 220, 230 and 240), and there is an air gap in a paraxial region between every two of the first lens element 210, the second lens element 220, the third lens element 230, and the fourth lens element 240 that are adjacent to each other.

The first lens element 210 having positive refractive power has an object-side surface 211 being convex and an image-side surface 212 being convex. The first lens element 210 is made of plastic material and has the object-side surface 211 and the image-side surface 212 being both aspheric.

The second lens element 220 having negative refractive power has an object-side surface 221 being concave and an image-side surface 222 being convex. The second lens element 220 is made of plastic material and has the object-side surface 221 and the image-side surface 222 being both aspheric, wherein both of the object-side surface 221 and the image-side surface 222 of the second lens element 220 have inflection point thereon.

The third lens element 230 having positive refractive power has an object-side surface 231 being convex and an image-side surface 232 being concave. The third lens element 230 is made of plastic material and has the object-side surface 231 and the image-side surface 232 being both aspheric, wherein both of the object-side surface 231 and the image-side surface 232 of the third lens element 230 have inflection point thereon.

The fourth lens element 240 having negative refractive power has an object-side surface 241 being concave and an image-side surface 242 being concave. The fourth lens element 240 is made of plastic material and has the object-side surface 241 and the image-side surface 242 being both aspheric, wherein both of the object-side surface 241 and the image-side surface 242 of the fourth lens element 240 have inflection point thereon.

The IR-filter 250 is made of glass material and located between the fourth lens element 240 and the image surface 260, and will not affect a focal length of the photographing lens system.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f | 3.33 | (R6 + R7)/(R6 − R7) | −0.07 |
| FNO | 2.80 | \|R8/f\| | 1.37 |
| HFOV | 34.7 | R5/R6 | 0.07 |
| V2 | 21.4 | f3/f | 0.83 |
| T12/CT2 | 2.54 | \|f3/f1\| | 1.00 |

TABLE 3

2nd Embodiment
f = 3.33 mm, Fno = 2.80, HFOV = 34.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.035 | | | | |
| 2 | Lens 1 | 2.391 | ASP | 0.445 | Plastic | 1.544 | 55.9 | 2.77 |
| 3 | | −3.826 | ASP | 0.761 | | | | |
| 4 | Lens 2 | −0.578 | ASP | 0.300 | Plastic | 1.650 | 21.4 | −2.78 |
| 5 | | −1.023 | ASP | 0.085 | | | | |
| 6 | Lens 3 | 1.419 | ASP | 0.640 | Plastic | 1.544 | 55.9 | 2.78 |
| 7 | | 19.876 | ASP | 0.390 | | | | |
| 8 | Lens 4 | −22.842 | ASP | 0.825 | Plastic | 1.544 | 55.9 | −6.91 |
| 9 | | 4.557 | ASP | 0.450 | | | | |
| 10 | IR-filter | Plano | | 0.353 | Glass | 1.517 | 64.2 | — |
| 11 | | Plano | | 0.187 | | | | |
| 12 | Image | Plano | | — | | | | |

Note:
Reference wavelength is 587.6 nm (d-line).

TABLE 4

Aspheric Coefficients

| Surface # | 2 | 3 | 4 | 5 |
|---|---|---|---|---|
| k = | −4.8310E+00 | 1.3452E+01 | −2.6999E+00 | −1.1705E+00 |
| A4 = | −9.1958E−02 | −1.8020E−01 | −3.9340E−01 | 1.6465E−02 |
| A6 = | −2.0736E−01 | −1.2392E−01 | 4.9432E−01 | 2.3061E−01 |
| A8 = | 4.8865E−02 | 5.4400E−02 | 1.8765E+00 | 2.4603E−01 |
| A10 = | −5.7691E−01 | −2.0307E−01 | −1.8298E+00 | 6.8464E−02 |
| A12 = | | | −4.9749E+00 | −2.6405E−01 |
| A14 = | | | 9.3283E+00 | −2.5309E−01 |
| A16 = | | | −4.3958E+00 | 2.7421E−01 |

| Surface # | 6 | 7 | 8 | 9 |
|---|---|---|---|---|
| k = | −1.3342E+01 | 9.6989E−01 | 4.7572E+01 | 5.1892E−01 |
| A4 = | 1.8317E−02 | 2.6548E−02 | −2.4270E−02 | −5.5907E−02 |
| A6 = | 2.5586E−03 | 4.0862E−03 | 1.1716E−02 | 1.1338E−03 |
| A8 = | −1.7708E−03 | −6.9743E−04 | 8.4828E−04 | 1.2024E−03 |
| A10 = | −5.0861E−04 | −1.7939E−04 | −1.8034E−04 | −2.6761E−04 |
| A12 = | 1.8126E−04 | −3.7024E−05 | −8.2874E−05 | 2.5611E−06 |
| A14 = | 1.0953E−04 | −8.3441E−06 | −1.4313E−05 | 1.1215E−05 |
| A16 = | −4.0550E−05 | 3.7835E−06 | 4.9200E−06 | −1.9098E−06 |

-continued

Embodiment 2

| | | | |
|---|---|---|---|
| T34/CT4 | 0.47 | f3/f4 | −0.40 |
| T34/(T12 + T23) | 0.46 | SD/TD | 0.99 |
| (R1 + R2)/(R1 − R2) | −0.23 | SD31/SD22 | 1.69 |
| (R3 − R4)/(R3 + R4) | −0.28 | | |

3rd Embodiment

Figure 5:
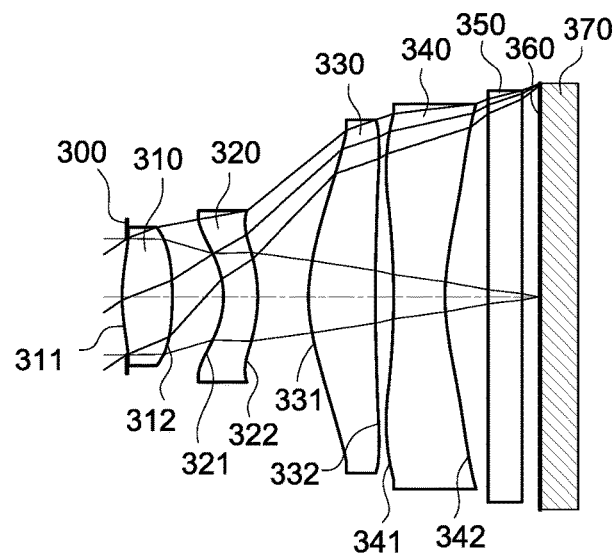
FIG. 5 is a schematic view of an image capturing device according to the 3rd embodiment of the present disclosure.
Figure 6:
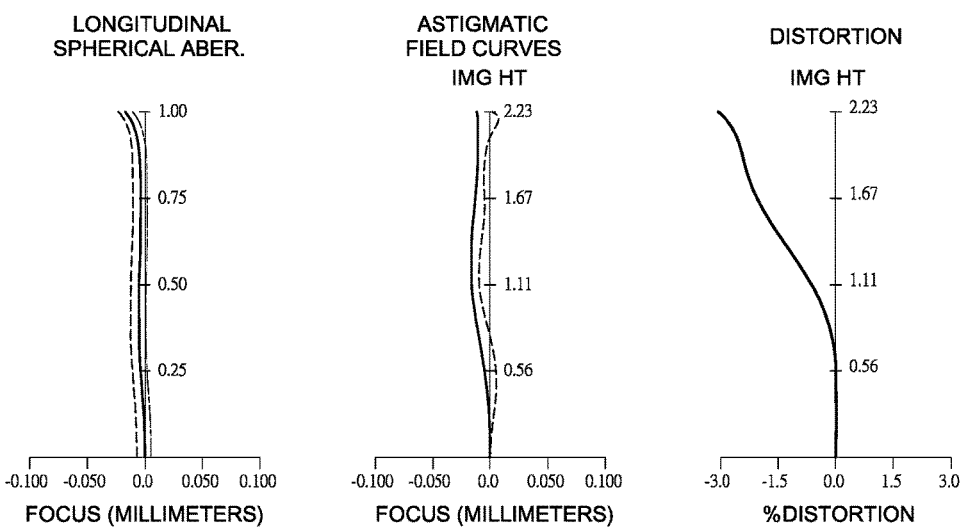
FIG. 6 shows spherical aberration curves, astigmatic field curves, and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves, and a distortion curve of the image capturing device according to the 3rd embodiment. In FIG. 5, the image capturing device includes a photographing lens system (its reference numeral in omitted) and an image sensor 370. The photographing lens system includes, in order from an object side to an image side, an aperture stop 300, a first lens element 310, a second lens element 320, a third lens element 330, a fourth lens element 340, an IR-filter 350, and an image sensor 360, wherein the image sensor 370 is located at the image surface 360 of the photographing lens system. The photographing lens system has a total of four lens elements (310, 320, 330 and 340), and there is an air gap in a paraxial region between every two of the first lens element 310, the second lens element 320, the third lens element 330, and the fourth lens element 340 that are adjacent to each other.

The first lens element 310 having positive refractive power has an object-side surface 311 being convex and an image-side surface 312 being convex. The first lens element 310 is made of plastic material and has the object-side surface 311 and the image-side surface 312 being both aspheric.

The second lens element 320 having negative refractive power has an object-side surface 321 being concave and an image-side surface 322 being convex. The second lens element 320 is made of plastic material and has the object-side surface 321 and the image-side surface 322 being both aspheric, wherein both of the object-side surface 321 and the image-side surface 322 of the second lens element 320 have inflection point thereon.

The third lens element 330 having positive refractive power has an object-side surface 331 being convex and an image-side surface 332 being concave. The third lens element 330 is made of plastic material and has the object-side surface 331 and the image-side surface 332 being both aspheric, wherein the object-side surface 331 and the image-side surface 332 of the third lens element 330 have inflection point thereon.

The fourth lens element 340 having negative refractive power has an object-side surface 341 being concave and an image-sides surface 342 being concave. The fourth lens element 340 is made of plastic material and has the object-side surface 341 and the image-side surface 342 being both aspheric, wherein both of the object-side surface 341 and the image-side surface 342 of the fourth lens element 340 have inflection point thereon.

The IR-filter 350 is made of glass material and located between the fourth lens element 340 and the image surface 360, and will not affect a focal length of the photographing lens system.

The detailed optical data of the 3rd embodiment are shown in Table 5 and the aspheric surface data are shown in Table 6 below.

TABLE 5

3rd Embodiment
f = 3.40 mm, Fno = 2.80, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.052 | | | | |
| 2 | Lens 1 | 2.066 | ASP | 0.524 | Plastic | 1.535 | 55.7 | 2.55 |
| 3 | | −3.647 | ASP | 0.535 | | | | |
| 4 | Lens 2 | −0.920 | ASP | 0.358 | Plastic | 1.650 | 21.4 | −4.07 |
| 5 | | −1.628 | ASP | 0.536 | | | | |
| 6 | Lens 3 | 1.713 | ASP | 0.699 | Plastic | 1.535 | 55.7 | 3.47 |
| 7 | | 18.822 | ASP | 0.191 | | | | |
| 8 | Lens 4 | −10.148 | ASP | 0.539 | Plastic | 1.535 | 55.7 | −3.73 |
| 9 | | 2.533 | ASP | 0.450 | | | | |
| 10 | IR-filter | Plano | | 0.353 | Glass | 1.517 | 64.2 | — |
| 11 | | Plano | | 0.189 | | | | |
| 12 | Image | Plano | | — | | | | |

Note:
Reference wavelength is 587.6 nm (d-line).

TABLE 6

Aspheric Coefficients

| Surface # | 2 | 3 | 4 | 5 |
|---|---|---|---|---|
| k = | −2.9561E+00 | 1.0681E+01 | −2.3458E+00 | −1.6533E−01 |
| A4 = | −7.4601E−02 | −2.1818E−01 | −3.5538E−01 | −9.5480E−02 |
| A6 = | −2.1734E−01 | −9.9711E−02 | 4.1267E−01 | 3.8957E−01 |
| A8 = | 1.1927E−01 | 2.3289E−02 | 1.7338E+00 | 1.8543E−01 |
| A10 = | −7.0874E−01 | −1.3242E−01 | −1.8760E+00 | −4.6752E−02 |
| A12 = | | | −4.4144E+00 | −2.2935E−01 |

TABLE 6-continued

| Aspheric Coefficients | | | | |
|---|---|---|---|---|
| A14 = | | | 9.5114E+00 | −1.1063E−01 |
| A16 = | | | −5.0148E+00 | 2.0142E−01 |

| Surface # | 6 | 7 | 8 | 9 |
|---|---|---|---|---|
| k = | −7.5501E+00 | 4.7979E+01 | 1.0839E+01 | 3.4730E−01 |
| A4 = | −2.0742E−02 | −4.8452E−03 | −1.9736E−02 | −8.6032E−02 |
| A6 = | 1.2101E−02 | −1.1735E−03 | 1.3789E−02 | 1.4221E−02 |
| A8 = | −2.3806E−03 | 6.5865E−04 | 6.1220E−04 | −2.6266E−04 |
| A10 = | −8.0650E−04 | 6.9302E−06 | −2.5615E−04 | −3.9698E−04 |
| A12 = | 1.3954E−04 | −1.3555E−05 | −9.1710E−05 | 2.2105E−05 |
| A14 = | 1.2182E−04 | −1.1356E−05 | −1.3566E−05 | 1.3823E−05 |
| A16 = | −2.8495E−05 | −2.9766E−07 | 5.9053E−06 | −2.8501E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 3.40 | (R6 + R7)/(R6 − R7) | 0.30 |
| FNO | 2.80 | |R8/f| | 0.74 |
| HFOV | 34.1 | R5/R6 | 0.09 |
| V2 | 21.4 | f3/f | 1.02 |
| T12/CT2 | 1.49 | |f3/f1| | 1.36 |
| T34/CT4 | 0.35 | f3/f4 | −0.93 |
| T34/(T12 + T23) | 0.18 | SD/TD | 0.98 |
| (R1 + R2)/(R1 − R2) | −0.28 | SD31/SD22 | 1.94 |
| (R3 − R4)/(R3 + R4) | −0.28 | | |

4th Embodiment

Figure 7:
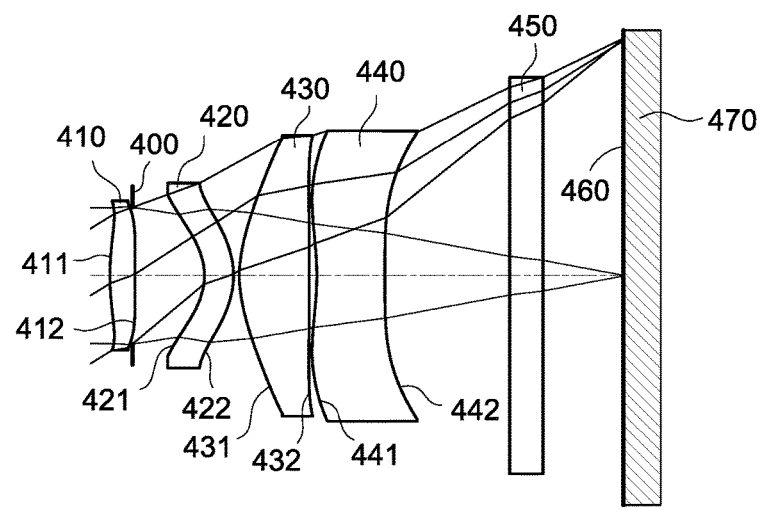
FIG. 7 is a schematic view of an image capturing device according to the 4th embodiment of the present disclosure.
Figure 8:
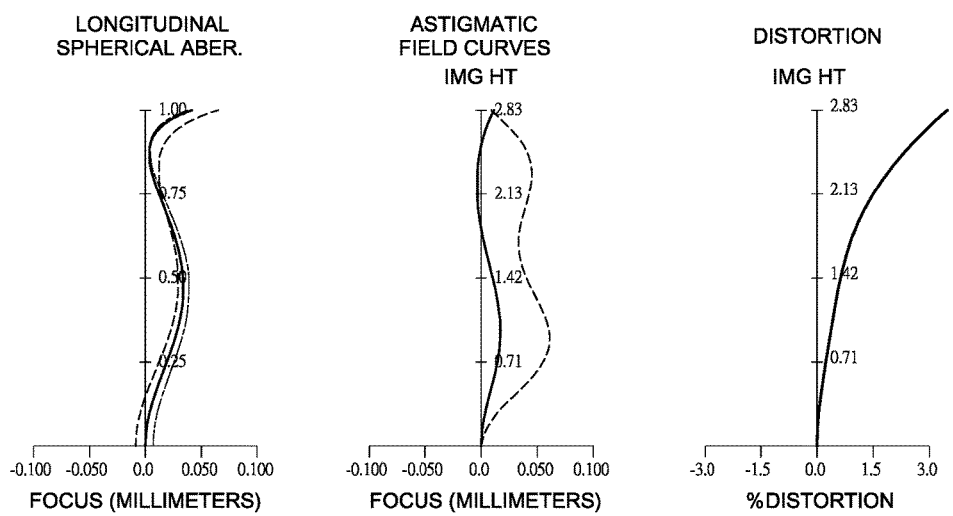
FIG. 8 shows spherical aberration curves, astigmatic field curves, and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves, and a distortion curve of the image capturing device according to the 4th embodiment. In FIG. 7, the image capturing device includes a photographing lens system (its reference numeral in omitted) and an image sensor 470. The photographing lens system includes, in order from an object side to an image side, a first lens element 410, an aperture stop 400, a second lens element 420, a third lens element 430, a fourth lens element 440, an IR-filter 450, and an image surface 460, wherein the image sensor 470 is located at the image surface 460 of the photographing lens system. The photographing lens system has a total of four lens elements (410, 420, 430 and 440), and there is an air gap in a paraxial region between every two of the first lens element 410, the second lens element 420, the third lens element 430, and the fourth lens element 440 that are adjacent to each other.

The first lens element 410 having positive refractive power has an object-side surface 411 being convex and an image-side surface 412 being concave. The first lens element 410 is made of plastic material and has the object-side surface 411 and the image-side surface 412 being both aspheric.

The second lens element 420 having negative refractive power has an object-side surface 421 being concave and an image-side surface 422 being convex. The second lens element 420 is made of plastic material and has the object-side surface 421 and the image-side surface 422 being both aspheric, wherein both of the object-side surface 421 and the image-side surface 422 of the second lens element 420 have inflection point thereon.

The third lens element 430 having positive refractive power has an object-side surface 431 being convex and an image-side surface 432 being concave. The third lens element 430 is made of plastic material and has the object-side surface 431 and the image-side surface 432 being both aspheric, wherein the image-side surface 432 of the third lens element 430 has at least one inflection point.

The fourth lens element 440 having negative refractive power has an object-side surface 441 being concave and an image-side surface 442 being concave. The fourth lens element 440 is made of plastic material and has the object-side surface 441 and the image-side surface 442 being both aspheric, wherein the object-side surface 441 of the fourth lens element 440 has at least one inflection point.

The IR-filter 450 is made of glass material and is located between the fourth lens element 440 and the image surface 460, and will not affect a focal length of the photographing lens system.

The detailed optical data of the 4th embodiment are shown in Table 7 and the aspheric surface data are shown in Table 8 below.

TABLE 7

4th Embodiment
f = 4.42 mm, Fno = 2.70, HFOV = 31.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.018 | ASP | 0.300 | Plastic | 1.544 | 55.9 | 6.82 |

TABLE 7-continued

4th Embodiment
f = 4.42 mm, Fno = 2.70, HFOV = 31.7 deg.

| Surface # | | Curvature Radius | | Thickness | Material | Index | Abbe # | Focal Length |
|---|---|---|---|---|---|---|---|---|
| 2 | | 15.556 | ASP | −0.028 | | | | |
| 3 | Ape. Stop | Plano | | 0.864 | | | | |
| 4 | Lens 2 | −0.744 | ASP | 0.350 | Plastic | 1.650 | 21.4 | −8.97 |
| 5 | | −1.010 | ASP | 0.070 | | | | |
| 6 | Lens 3 | 1.554 | ASP | 0.840 | Plastic | 1.544 | 55.9 | 2.86 |
| 7 | | 465.116 | ASP | 0.091 | | | | |
| 8 | Lens 4 | −3.359 | ASP | 0.826 | Plastic | 1.640 | 23.3 | −5.04 |
| 9 | | 88.106 | ASP | 1.500 | | | | |
| 10 | IR-filter | Plano | | 0.400 | Glass | 1.517 | 64.2 | — |
| 11 | | Plano | | 0.968 | | | | |
| 12 | Image | Plano | | — | | | | |

Note:
Reference wavelength is 587.6 nm (d-line).

TABLE 8

Aspheric Coefficients

| Surface # | 1 | 2 | 4 | 5 |
|---|---|---|---|---|
| k = | −4.7746E+00 | −1.0000E+01 | −2.3461E+00 | −2.4089E+00 |
| A4 = | −5.4743E−02 | −1.2101E−01 | −1.1896E−01 | −9.5718E−02 |
| A6 = | −8.6540E−02 | −6.9910E−02 | −2.7548E−02 | 3.0334E−02 |
| A8 = | 8.2441E−03 | −3.2671E−02 | 3.3012E−01 | 1.2640E−01 |
| A10 = | −6.4943E−02 | 1.2589E−02 | −1.7093E−01 | −5.5507E−02 |
| A12 = | | | 1.2268E−02 | 2.0941E−03 |
| A14 = | | | −2.9553E−03 | −2.0998E−05 |

| Surface # | 6 | 7 | 8 | 9 |
|---|---|---|---|---|
| k = | −6.1682E+00 | −1.0000E+00 | −9.9064E+00 | −1.0000E+00 |
| A4 = | 1.0247E−02 | −1.6770E−02 | 8.7957E−02 | 7.1112E−02 |
| A6 = | −9.3197E−03 | 1.6205E−02 | −1.4411E−02 | −8.5486E−03 |
| A8 = | 3.3709E−03 | −5.7450E−03 | −7.4225E−04 | −1.4382E−03 |
| A10 = | −3.1794E−04 | 9.4727E−04 | 3.8013E−04 | 3.2663E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f | 4.42 | (R6 + R7)/(R6 − R7) | 0.99 |
| FNO | 2.70 | |R8/f| | 19.94 |
| HFOV | 31.7 | R5/R6 | 0.00 |
| V2 | 21.4 | f3/f | 0.65 |
| T12/CT2 | 2.39 | |f3/f1| | 0.42 |
| T34/CT4 | 0.11 | f3/f4 | −0.57 |
| T34/(T12 + T23) | 0.10 | SD/TD | 0.92 |
| (R1 + R2)/(R1 − R2) | −1.48 | SD31/SD22 | 1.49 |
| (R3 − R4)/(R3 + R4) | −0.15 | | |

5th Embodiment

Figure 9:
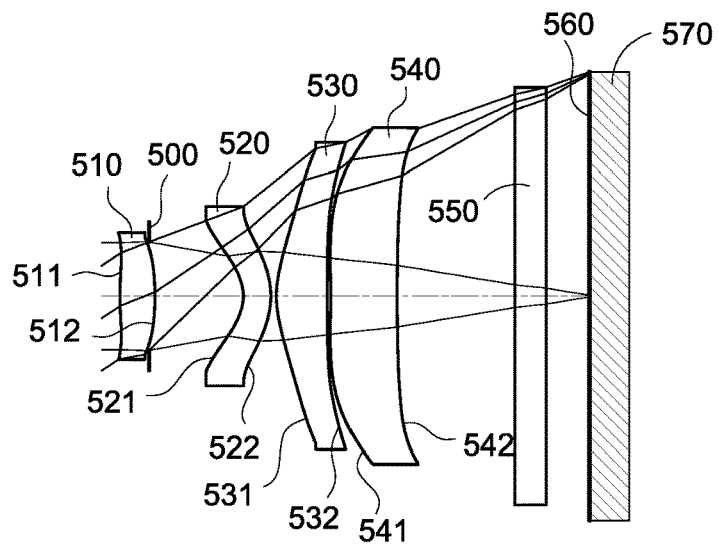
FIG. 9 is a schematic view of an image capturing device according to the 5th embodiment of the present disclosure.
Figure 10:
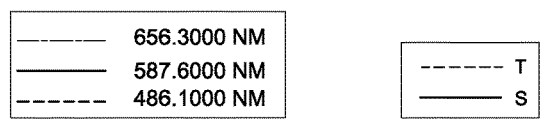
FIG. 10 shows spherical aberration curves, astigmatic field curves, and a distortion curve of the image capturing device according to the 5th embodiment.
Figure 10:
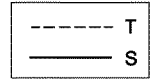
Figure 10:
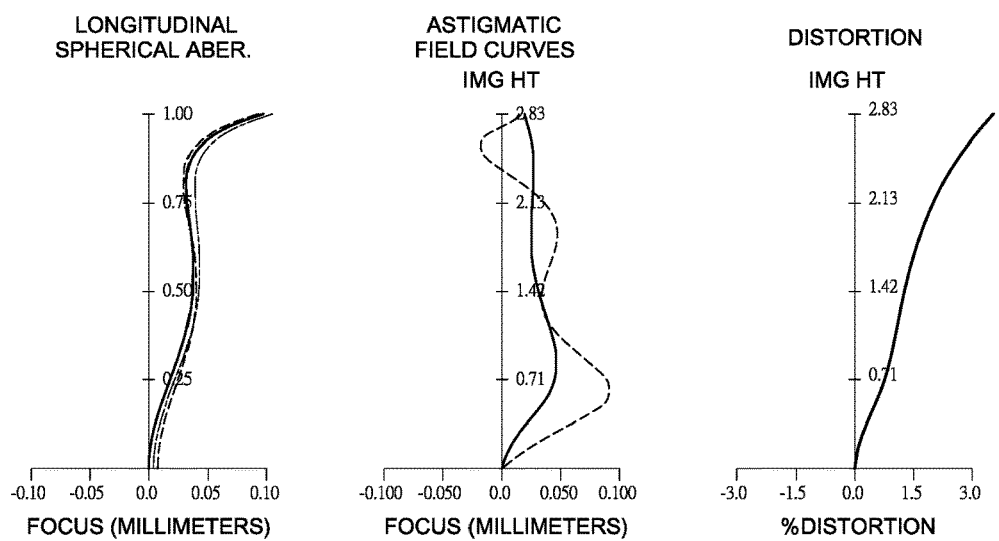

FIG. 9 is a schematic view of an image capturing device according to the 5th embodiment of the present disclosure. FIG. 10 shows spherical aberration curves, astigmatic field curves, and a distortion curve of the image capturing device according to the 5th embodiment. In FIG. 5, the image capturing device includes a photographing lens system (its reference numeral in omitted) and an image sensor 570. The photographing lens system includes, in order from an object side to an image side, a first lens element 510, an aperture stop 500, a second lens element 520, a third lens element 530, a fourth lens element 540, an IR-filter 550, and an image sensor 560, wherein the image sensor 560 is located at the image surface 570 of the photographing lens system. The photographing lens system has a total of four lens elements (510, 520, 530 and 540), and there is an air gap in a paraxial region between every two of the first lens element 510, the second lens element 520, the third lens element 530, and the fourth lens element 540 that are adjacent to each other.

The first lens element 510 having positive refractive power has an object-side surface 511 being convex and an image-side surface 512 being convex. The first lens element 510 is made of plastic material and has the object-side surface 511 and the image-side surface 512 being both aspheric.

The second lens element 520 having negative refractive power has an object-side surface 521 being concave and an image-side surface 522 being convex. The second lens element 520 is made of plastic material and has the object-side surface 521 and the image-side surface 522 being both aspheric, wherein both of the object-side surface 521 and the image-side surface 522 of the second lens element 520 have inflection point thereon.

The third lens element 530 having positive refractive power has an object-side surface 531 being convex and an image-side surface 532 being concave. The third lens element 530 is made of plastic material and has the object-side surface 531 and the image-side surface 532 being both aspheric, wherein both of the object-side surface 531 and the image-side surface 532 of the third lens element 530 have inflection point thereon.

The fourth lens element 540 having negative refractive power has an object-side surface 541 being concave and an image-sides surface 542 being concave. The fourth lens element 540 is made of plastic material and has the object-side surface 541 and the image-side surface 542 being both aspheric, wherein the object-side surface 541 of the fourth lens element 340 has at least one inflection point thereon.

The IR-filter 550 is made of glass material and is located between the fourth lens element 530 and the image surface 560, and will not affect a focal length of the photographing lens system.

The detailed optical data of the 5th embodiment are shown in Table 9 and the aspheric surface data are shown in Table 10 below.

TABLE 9

5th Embodiment
f = 4.10 mm, Fno = 3.00, HFOV = 33.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.869 | ASP | 0.444 | Plastic | 1.544 | 55.9 | 4.10 |
| 2 | | −3.501 | ASP | −0.075 | | | | |
| 3 | Ape. Stop | Plano | | 1.204 | | | | |
| 4 | Lens 2 | −0.557 | ASP | 0.350 | Plastic | 1.650 | 21.4 | −2.44 |
| 5 | | −1.072 | ASP | 0.070 | | | | |
| 6 | Lens 3 | 1.265 | ASP | 0.650 | Plastic | 1.544 | 55.9 | 2.35 |
| 7 | | 82.305 | ASP | 0.045 | | | | |
| 8 | Lens 4 | −14.166 | ASP | 0.840 | Plastic | 1.535 | 55.7 | −20.28 |
| 9 | | 47.315 | ASP | 1.500 | | | | |
| 10 | IR-filter | Plano | | 0.400 | Glass | 1.517 | 64.2 | — |
| 11 | | Plano | | 0.554 | | | | |
| 12 | Image | Plano | | — | | | | |

Note:
Reference wavelength is 587.6 nm (d-line).

TABLE 10

Aspheric Coefficients

| Surface # | 1 | 2 | 4 | 5 |
|---|---|---|---|---|
| k = | −9.7910E+00 | −1.6932E+00 | −2.5036E+00 | −1.8391E+00 |
| A4 = | −9.8805E−02 | −1.3655E−01 | −2.2675E−01 | −2.3509E−02 |
| A6 = | −8.6203E−02 | −2.3827E−02 | 2.4726E−01 | 6.3181E−02 |
| A8 = | 1.4280E−02 | −7.1151E−02 | 1.8792E−01 | 5.7894E−02 |
| A10 = | −9.9834E−02 | 4.6064E−02 | −1.8617E−01 | −4.8654E−02 |
| A12 = | | | 1.2522E−02 | 3.2286E−02 |
| A14 = | | | 6.4333E−04 | −1.2950E−02 |

| Surface # | 6 | 7 | 8 | 9 |
|---|---|---|---|---|
| k = | −1.0000E+01 | −1.0000E+01 | −1.0000E+00 | −1.0000E+01 |
| A4 = | −2.1729E−03 | 1.6564E−02 | 6.0681E−02 | 1.2623E−02 |
| A6 = | −5.8126E−03 | 7.3902E−03 | −5.8663E−03 | −4.9859E−03 |
| A8 = | 3.1999E−03 | −4.7069E−03 | −1.3567E−03 | 8.0669E−04 |
| A10 = | −3.8278E−04 | 1.0101E−03 | 4.6576E−04 | 1.9513E−04 |
| A12 = | −8.6113E−07 | −8.4047E−05 | −3.9192E−05 | −3.3644E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f | 4.10 | (R6 + R7)/(R6 − R7) | 0.71 |
| FNO | 3.00 | |R8/f| | 11.53 |
| HFOV | 33.6 | R5/R6 | 0.02 |
| V2 | 21.4 | f3/f | 0.57 |
| T12/CT2 | 3.23 | |f3/f1| | 0.57 |
| T34/CT4 | 0.05 | f3/f4 | −0.12 |
| T34/(T12 + T23) | 0.04 | SD/TD | 0.90 |
| (R1 + R2)/(R1 − R2) | 0.25 | SD31/SD22 | 1.64 |
| (R3 − R4)/(R3 + R4) | −0.32 | | |

6th Embodiment

Figure 11:
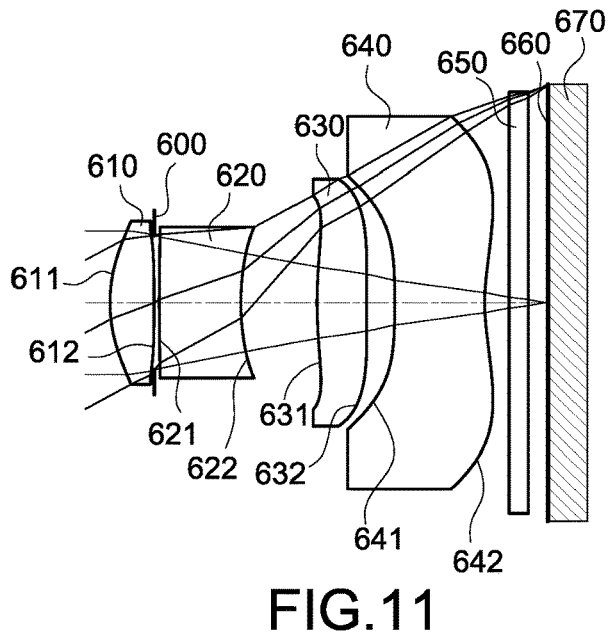
FIG. 11 is a schematic view of an image capturing device according to the 6th embodiment of the present disclosure.
Figure 12:
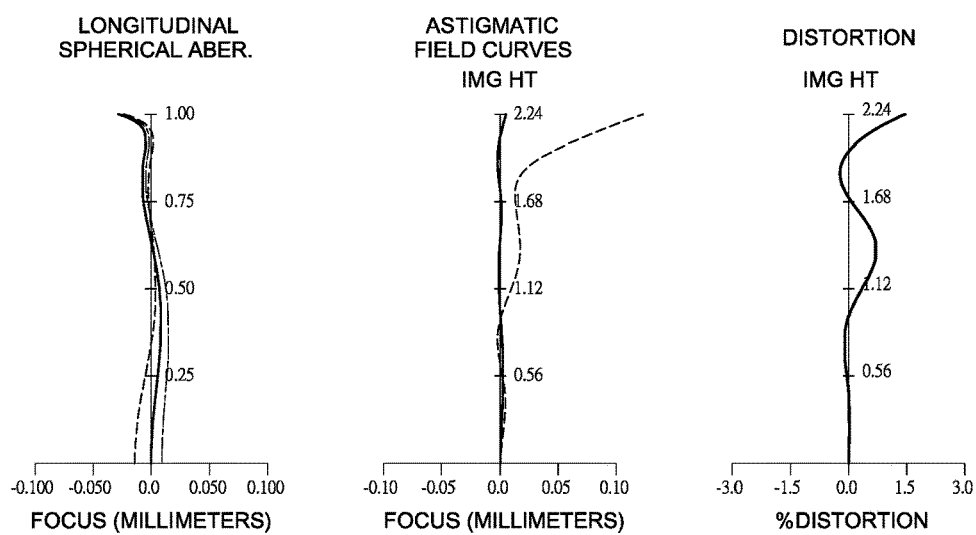
FIG. 12 shows spherical aberration curves, astigmatic field curves, and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves, and a distortion curve of the image capturing device according to the 6th embodiment. In FIG. 11, the image capturing device includes a photographing lens system (its reference numeral in omitted) and an image sensor 670. The photographing lens system includes, in order from an object side to an image side, a first lens element 610, an aperture stop 600, a second lens element 620, a third lens element 630, a fourth lens element 640, an IR-filter 650, and an image sensor 660, wherein the image sensor 660 is located at the image surface 670 of the photographing lens system. The photographing lens system has a total of four lens elements (610, 620, 630 and 640), and there is an air gap in a paraxial region between every two of the first lens element 610, the second lens element 620, the third lens element 630, and the fourth lens element 640 that are adjacent to each other.

The first lens element 610 having positive refractive power has an object-side surface 611 being convex and an image-side surface 612 being concave. The first lens element 610 is made of plastic material and has the object-side surface 611 and the image-side surface 612 being both aspheric.

The second lens element 620 having negative refractive power has an object-side surface 621 being convex and an image-side surface 622 being concave. The second lens element 620 is made of plastic material and has the object-side surface 621 and the image-side surface 622 being both aspheric, wherein both of the object-side surface 621 and the image-side surface 622 of the second lens element 620 have inflection point thereon.

The third lens element 630 having positive refractive power has an object-side surface 631 being convex and an image-side surface 632 being concave. The third lens element 630 is made of plastic material and has the object-side surface 631 and the image-side surface 632 being both aspheric, wherein both of the object-side surface 631 and the image-side surface 632 of the third lens element 630 have inflection point thereon.

The fourth lens element 640 having negative refractive power has an object-side surface 641 being concave and an image-sides surface 642 being concave. The fourth lens element 640 is made of plastic material and has the object-side surface 641 and the image-side surface 642 being both aspheric, wherein the image-side surface 642 of the fourth lens element 640 has at least one inflection point.

The IR-filter 650 is made of glass material and is located between the fourth lens element 640 and the image surface 660, and will not affect a focal length of the photographing lens system.

The detailed optical data of the 6th embodiment are shown in Table 11 and the aspheric surface data are shown in Table 12 below.

TABLE 11

6th Embodiment
f = 4.08 mm, Fno = 2.75, HFOV = 28.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.532 | ASP | 0.454 | Plastic | 1.535 | 55.7 | 2.90 |
| 2 | | 100.000 | ASP | 0.003 | | | | |
| 3 | Ape. Stop | Plano | | 0.050 | | | | |
| 4 | Lens 2 | 9.714 | ASP | 0.840 | Plastic | 1.650 | 21.4 | −5.79 |
| 5 | | 2.618 | ASP | 0.777 | | | | |
| 6 | Lens 3 | 4.800 | ASP | 0.511 | Plastic | 1.535 | 56.3 | 10.59 |
| 7 | | 30.347 | ASP | 0.287 | | | | |
| 8 | Lens 4 | −46.893 | ASP | 0.928 | Plastic | 1.535 | 55.7 | −3.88 |
| 9 | | 2.186 | ASP | 0.250 | | | | |
| 10 | IR-filter | Plano | | 0.200 | Glass | 1.517 | 64.2 | — |
| 11 | | Plano | | 0.200 | | | | |
| 12 | Image | Plano | | — | | | | |

Note:
Reference wavelength is 587.6 nm (d-line).

TABLE 12

| Aspheric Coefficients | | | | |
|---|---|---|---|---|
| Surface # | 1 | 2 | 4 | 5 |
| k = | −5.5847E+00 | −1.0000E+00 | −1.0000E+00 | 1.3823E+00 |
| A4 = | 1.5581E−01 | −2.4072E−01 | −1.9147E−01 | −1.1428E−02 |
| A6 = | −1.0813E−01 | 4.4239E−01 | 3.6754E−01 | 1.0234E−01 |
| A8 = | 8.1619E−02 | −6.5021E−01 | −4.2812E−01 | −1.2337E−01 |
| A10 = | −3.0901E−01 | 3.9893E−01 | 5.2865E−01 | 1.4744E−01 |
| A12 = | 2.3840E−01 | 1.2284E−01 | −5.0500E−01 | −3.9448E−02 |
| A14 = | 2.3631E−01 | 9.7209E−02 | 1.5255E−01 | 2.6958E−01 |
| A16 = | −3.4262E−01 | −4.9082E−01 | 2.2602E−01 | −3.3504E−01 |
| Surface # | 6 | 7 | 8 | 9 |
| k = | 1.1899E+01 | −2.0000E+01 | −2.0000E+01 | −3.0508E−01 |
| A4 = | −4.1887E−02 | −1.0408E−01 | −3.3494E−01 | −2.7442E−01 |
| A6 = | −1.0293E−01 | 4.3243E−02 | 3.1993E−01 | 2.0101E−01 |
| A8 = | 1.1516E−01 | −4.4363E−02 | −2.9675E−01 | −1.0681E−01 |
| A10 = | −7.7673E−02 | 1.7864E−02 | 1.3827E−01 | 3.0011E−02 |
| A12 = |  | −6.6637E−03 | −2.0344E−02 | −4.1863E−03 |
| A14 = |  | −4.3023E−05 | −1.4747E−03 | 2.2733E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f | 4.08 | (R6 + R7)/(R6 − R7) | −0.21 |
| FNO | 2.75 | |R8/f| | 0.54 |
| HFOV | 28.4 | R5/R6 | 0.16 |
| V2 | 21.4 | f3/f | 2.60 |
| T12/CT2 | 0.06 | |f3/f1| | 3.65 |
| T34/CT4 | 0.31 | f3/f4 | −2.73 |
| T34/(T12 + T23) | 0.35 | SD/TD | 0.88 |
| (R1 + R2)/(R1 − R2) | −1.03 | SD31/SD22 | 1.42 |
| (R3 − R4)/(R3 + R4) | 0.58 | | |

7th Embodiment

Figure 13:
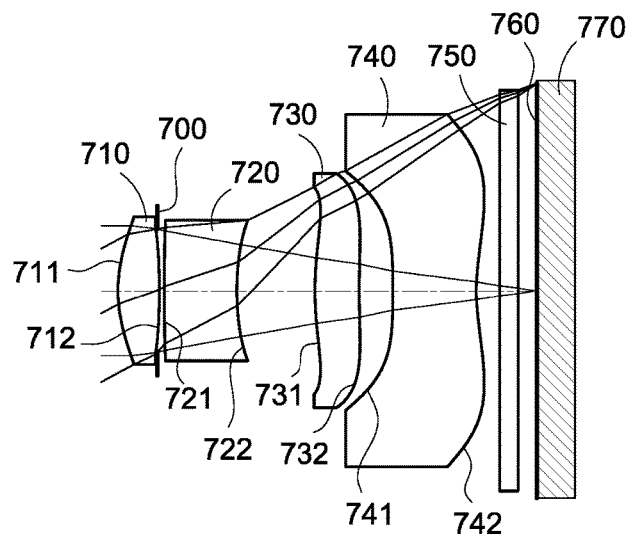
FIG. 13 is a schematic view of an image capturing device according to the 7th embodiment of the present disclosure.
Figure 14:
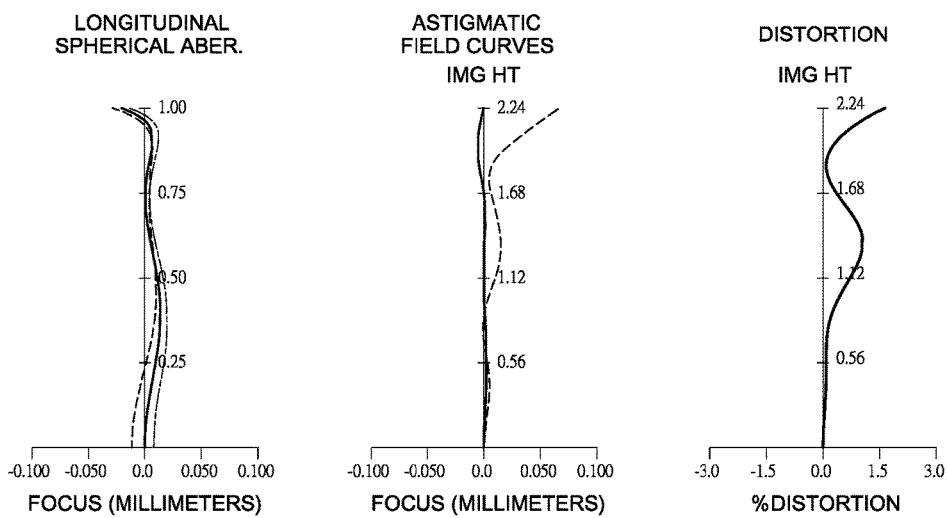
FIG. 14 shows spherical aberration curves, astigmatic field curves, and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves, and a distortion curve of the image capturing device according to the 7th embodiment. In FIG. 13, the image capturing device includes a photographing lens system (its reference numeral in omitted) and an image sensor 770. The photographing lens system includes, in order from an object side to an image side, a first lens element 710, an aperture stop 700, a second lens element 720, a third lens element 730, a fourth lens element 740, an IR-filter 750, and an image sensor 760, wherein the image sensor 760 is located at the image surface 770 of the photographing lens system. The photographing lens system has a total of four lens elements (710, 720, 730 and 740), and there is an air gap in a paraxial region between every two of the first lens element 710, the second lens element 720, the third lens element 730, and the fourth lens element 740 that are adjacent to each other.

The first lens element 710 having positive refractive power has an object-side surface 711 being convex and an image-side surface 712 being convex. The first lens element 710 is made of plastic material and has the object-side surface 711 and the image-side surface 712 being both aspheric.

The second lens element 720 having negative refractive power has an object-side surface 721 being convex and an image-side surface 722 being concave. The second lens element 720 is made of plastic material and has the object-side surface 721 and the image-side surface 722 being both aspheric, wherein the object-side surface 721 of the second lens element 720 has at least one inflection point.

The third lens element 730 having positive refractive power has an object-side surface 731 being convex and an image-side surface 732 being concave. The third lens element 730 is made of plastic material and has the object-side surface 731 and the image-side surface 732 being both aspheric, wherein both of the object-side surface 731 and the image-side surface 732 of the third lens element 730 have inflection point thereon.

The fourth lens element 740 having negative refractive power has an object-side surface 741 being concave and an image-sides surface 742 being concave. The fourth lens element 740 is made of plastic material and has the object-side surface 741 and the image-side surface 742 being both aspheric, wherein the image-side surface 742 of the fourth lens element 740 has at least one inflection point.

The IR-filter 750 is made of glass material and is located between the fourth lens element 740 and the image surface 760, and will not affect a focal length of the photographing lens system.

The detailed optical data of the 7th embodiment are shown in Table 13 and the aspheric surface data are shown in Table 14 below.

TABLE 13

7th Embodiment
f = 4.09 mm, Fno = 2.90, HFOV = 28.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.640 | ASP | 0.444 | Plastic | 1.535 | 55.7 | 2.87 |
| 2 | | −21.982 | ASP | −0.020 | | | | |
| 3 | Ape. Stop | Plano | | 0.076 | | | | |
| 4 | Lens 2 | 13.042 | ASP | 0.780 | Plastic | 1.650 | 21.4 | −5.84 |
| 5 | | 2.871 | ASP | 0.849 | | | | |
| 6 | Lens 3 | 3.635 | ASP | 0.477 | Plastic | 1.535 | 55.7 | 11.48 |
| 7 | | 8.495 | ASP | 0.361 | | | | |
| 8 | Lens 4 | −46.893 | ASP | 0.900 | Plastic | 1.535 | 55.7 | −3.95 |
| 9 | | 2.230 | ASP | 0.250 | | | | |
| 10 | IR-filter | Plano | | 0.200 | Glass | 1.517 | 64.2 | — |
| 11 | | Plano | | 0.201 | | | | |
| 12 | Image | Plano | | — | | | | |

Note:
Reference wavelength is 587.6 nm (d-line).

TABLE 14

Aspheric Coefficients

| Surface # | 1 | 2 | 4 | 5 |
|---|---|---|---|---|
| k = | −6.7712E+00 | −1.0000E+00 | −1.0000E+00 | 1.1741E+00 |
| A4 = | 1.3423E−01 | −2.4544E−01 | −1.7918E−01 | −1.3802E−02 |
| A6 = | −1.1374E−01 | 3.2891E−01 | 3.1464E−01 | 1.0300E−01 |
| A8 = | −6.4369E−02 | −2.4909E−01 | −5.5037E−02 | −8.2510E−02 |
| A10 = | −1.1032E−01 | 1.4240E−01 | 2.2967E−01 | 1.0863E−01 |
| A12 = | 2.3840E−01 | 1.2284E−01 | −5.0500E−01 | −3.9451E−02 |
| A14 = | 2.3631E−01 | 9.7207E−02 | 1.5255E−01 | 2.6958E−01 |
| A16 = | −3.4262E−01 | −4.9082E−01 | 2.2602E−01 | −3.3504E−01 |

| Surface # | 6 | 7 | 8 | 9 |
|---|---|---|---|---|
| k = | 4.7250E+00 | −3.0232E+00 | −2.0000E+01 | −4.1408E−01 |
| A4 = | −6.1748E−02 | −1.0119E−01 | −3.1050E−01 | −2.5754E−01 |
| A6 = | −7.5192E−02 | 2.3181E−02 | 2.7700E−01 | 1.8884E−01 |
| A8 = | 8.5919E−02 | −3.7884E−02 | −2.8468E−01 | −1.0357E−01 |
| A10 = | −5.8381E−02 | 2.2245E−02 | 1.3938E−01 | 3.0070E−02 |
| A12 = | | −9.8787E−03 | −2.0445E−02 | −4.2931E−03 |
| A14 = | | 3.7003E−04 | −1.7637E−03 | 2.3726E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, Moreover, these parameters can be calculated from Table 13 and Table 14 as the following values and satisfy the following conditions:

| Embodiment 7 | | | |
|---|---|---|---|
| f | 4.09 | (R6 + R7)/(R6 − R7) | −0.69 |
| FNO | 2.90 | |R8/f| | 0.55 |
| HFOV | 28.3 | R5/R6 | 0.43 |
| V2 | 21.4 | f3/f | 2.81 |
| T12/CT2 | 0.07 | |f3/f1| | 4.00 |
| T34/CT4 | 0.40 | f3/f4 | −2.90 |
| T34/(T12 + T23) | 0.40 | SD/TD | 0.89 |
| (R1 + R2)/(R1 − R2) | −0.86 | SD31/SD22 | 1.47 |
| (R3 − R4)/(R3 + R4) | 0.64 | | |

8th Embodiment

Figure 15:
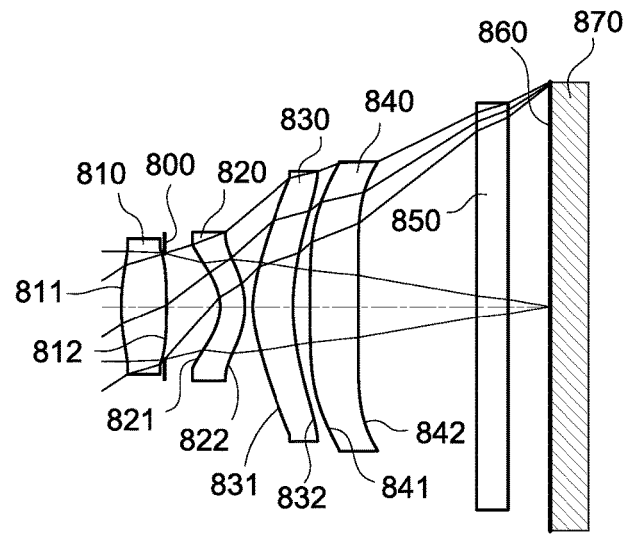
FIG. 15 is a schematic view of an image capturing device according to the 8th embodiment of the present disclosure.
Figure 16:
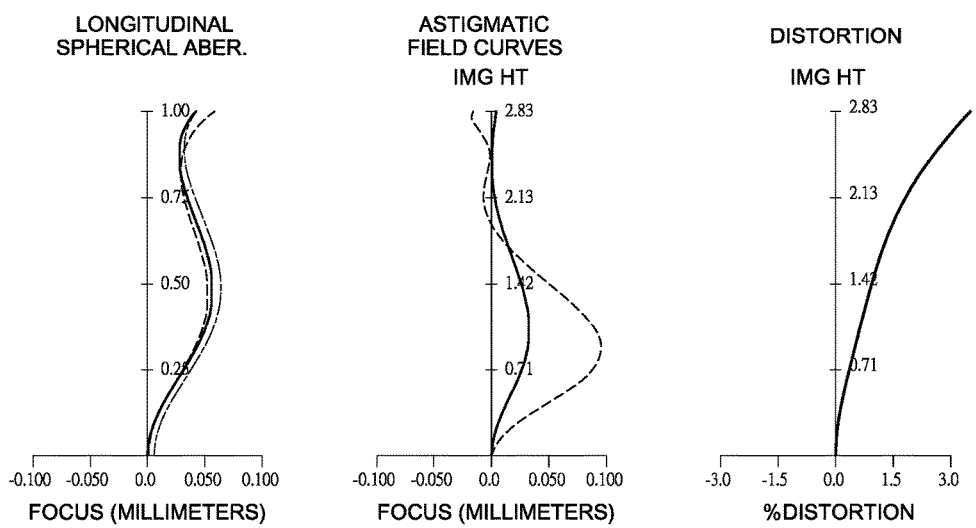
FIG. 16 shows spherical aberration curves, astigmatic field curves, and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves, and a distortion curve of the image capturing device according to the 8th embodiment. In FIG. 15, the image capturing device includes a photographing lens system (its reference numeral in omitted) and an image sensor 870. The photographing lens system includes, in order from an object side to an image side, a first lens element 810, an aperture stop 800, a second lens element 820, a third lens element 830, a fourth lens element 840, an IR-filter 850, and an image sensor 860, wherein the image sensor 860 is located at the image surface 870 of the photographing lens system. The photographing lens system has a total of four lens elements (810, 820, 830 and 840), and there is an air gap in a paraxial region between every two of the first lens element 810, the second lens element 820, the third lens element 830, and the fourth lens element 840 that are adjacent to each other.

The first lens element 810 having positive refractive power has an object-side surface 811 being convex and an image-side surface 812 being convex. The first lens element 810 is made of plastic material and has the object-side surface 811 and the image-side surface 812 being both aspheric.

The second lens element 820 having negative refractive power has an object-side surface 821 being concave and an image-side surface 822 being convex. The second lens element 820 is made of plastic material and has the object-side surface 821 and the image-side surface 822 being both aspheric, wherein both of the object-side surface 821 and the image-side surface 822 of the second lens element 820 have inflection point thereon.

The third lens element 830 having positive refractive power has an object-side surface 831 being convex and an image-side surface 832 being concave. The third lens element 830 is made of plastic material and has the object-side surface 831 and the image-side surface 832 being both aspheric, wherein both of the object-side surface 831 and the image-side surface 832 of the third lens element 830 have inflection point thereon.

The fourth lens element 840 having positive refractive power has an object-side surface 841 being concave and an image-sides surface 842 being convex. The fourth lens element 840 is made of plastic material and has the object-side surface 841 and the image-side surface 842 being both aspheric, wherein both of the object-side surface 841 and the image-side surface 842 of the fourth lens element 840 have inflection point thereon.

The IR-filter 850 is made of glass material and is located between the fourth lens element 840 and the image surface 860, and will not affect a focal length of the photographing lens system.

The detailed optical data of the 8th embodiment are shown in Table 15 and the aspheric surface data are shown in Table 16 below.

TABLE 15

8th Embodiment
f = 4.08 mm, Fno = 2.90, HFOV = 33.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.456 | ASP | 0.576 | Plastic | 1.544 | 55.9 | 3.65 |
| 2 | | −9.492 | ASP | −0.025 | | | | |
| 3 | Ape. Stop | Plano | | 0.705 | | | | |
| 4 | Lens 2 | −0.618 | ASP | 0.314 | Plastic | 1.650 | 21.4 | −3.14 |
| 5 | | −1.064 | ASP | 0.101 | | | | |
| 6 | Lens 3 | 1.222 | ASP | 0.517 | Plastic | 1.544 | 55.9 | 3.63 |
| 7 | | 2.728 | ASP | 0.218 | | | | |
| 8 | Lens 4 | −196.078 | ASP | 0.613 | Plastic | 1.535 | 55.7 | 69.89 |
| 9 | | −31.437 | ASP | 1.500 | | | | |
| 10 | IR-filter | Plano | | 0.400 | Glass | 1.517 | 64.2 | — |
| 11 | | Plano | | 0.534 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k = | −1.0000E+00 | −3.5724E+00 | −2.9544E+00 | −9.2298E−01 |
| A4 = | −5.5490E−02 | −1.3930E−01 | −4.6694E−01 | −2.9457E−02 |
| A6 = | −4.4311E−02 | −8.6442E−02 | 7.3405E−01 | 2.9810E−01 |
| A8 = | −2.7711E−02 | 4.1343E−02 | 2.7010E−01 | 1.2669E−01 |
| A10 = | −6.3651E−02 | 2.3308E−03 | −6.1656E−01 | −1.4896E−01 |
| A12 = | | | 1.2522E−02 | −1.3754E−02 |
| A14 = | | | 6.4333E−04 | 4.6965E−03 |

| Surface # | 6 | 7 | 8 | 9 |
|---|---|---|---|---|
| k = | −1.0000E+01 | −6.9448E+00 | −1.0000E+01 | −1.0000E+01 |
| A4 = | 8.0993E−03 | −1.2939E−02 | 5.8031E−02 | 1.8161E−02 |
| A6 = | −4.2436E−03 | 1.0595E−02 | −6.1571E−03 | 7.9699E−04 |
| A8 = | 2.7266E−03 | −4.3703E−03 | −1.3230E−03 | 9.7079E−04 |
| A10 = | −3.9808E−04 | 7.3595E−04 | 5.4762E−04 | 1.0803E−05 |
| A12 = | −4.2901E−05 | −9.2498E−05 | −7.4937E−05 | −4.7852E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f | 4.08 | (R6 + R7)/(R6 − R7) | −0.97 |
| FNO | 2.90 | |R8/f| | 7.70 |
| HFOV | 33.6 | R5/R6 | 0.45 |
| V2 | 21.4 | f3/f | 0.89 |
| T12/CT2 | 2.17 | |f3/f1| | 1.00 |
| T34/CT4 | 0.36 | f3/f4 | 0.05 |
| T34/(T12 + T23) | 0.28 | SD/TD | 0.82 |
| (R1 + R2)/(R1 − R2) | −0.59 | SD31/SD22 | 1.73 |
| (R3 − R4)/(R3 + R4) | −0.27 | | |

9th Embodiment

Figure 17:
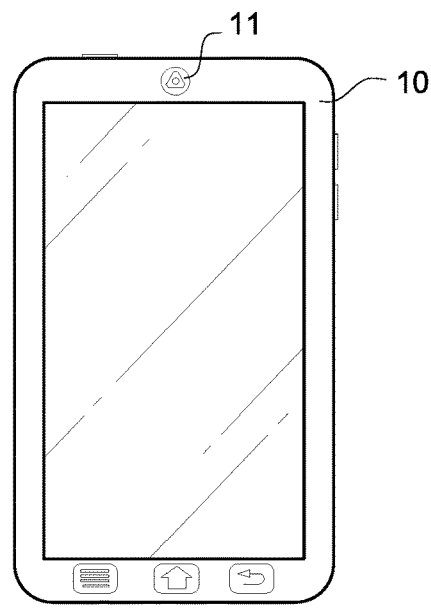
FIG. 17 is a schematic view of an electronic device according to the 9th embodiment of the present disclosure.

FIG. 17 is a schematic view of an electronic device 10 according to the 9th embodiment of the present disclosure. The electronic device 10 of the 9th embodiment is a smart phone, wherein the electronic device 10 includes an image capturing device 11. The image capturing device 11 includes a photographing lens system (not otherwise herein labeled) according to the present disclosure and an image sensor (not otherwise herein labeled), wherein the image sensor is located at an image side of the photographing lens system.

10th Embodiment

Figure 18:
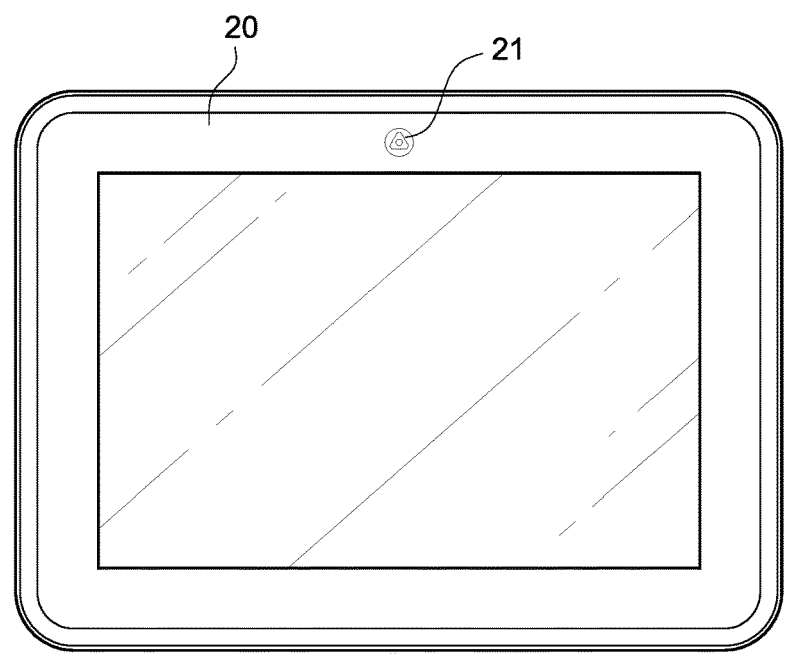
FIG. 18 is a schematic view of an electronic device according to the 10th embodiment of the present disclosure.

FIG. 18 is a schematic view of an electronic device 20 according to the 10th embodiment of the present disclosure. The electronic device 20 of the 10th embodiment is a tablet personal computer, wherein the electronic device 20 includes an image capturing device 21. The image capturing device 21 includes a photographing lens system (not otherwise herein labeled) according to the present disclosure and an image sensor (not otherwise herein labeled), wherein the image sensor is located at an image side of the photographing lens system.

11th Embodiment

Figure 19:
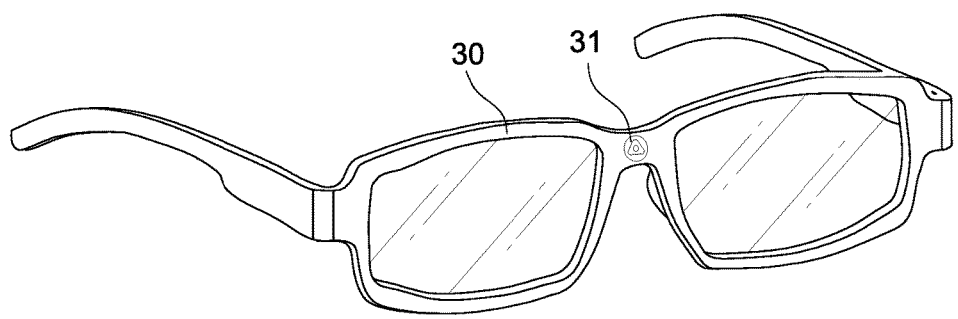
FIG. 19 is a schematic view of an electronic device according to the 11th embodiment of the present disclosure.

FIG. 19 is a schematic view of an electronic device 30 according to the 11th embodiment of the present disclosure. The electronic device 30 of the 11th embodiment is a head-mounted display (HMD), wherein the electronic device 30 includes an image capturing device 31. The image capturing device 31 includes a photographing lens system (not otherwise herein labeled) according to the present disclosure and an image sensor (not otherwise herein labeled), wherein the image sensor is located at an image side of the photographing lens system.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising four lens elements, the four lens elements being, in order from an object side to an image side:
    a first lens element with positive refractive power having an object-side surface being convex;
    a second lens element with negative refractive power having an image-side surface being concave;
    a third lens element having an image-side surface being concave, wherein an object-side surface and the image-side surface of the third lens element are both aspheric, and at least one surface of the third lens element has at least one inflection point; and
    a fourth lens element with negative refractive power having an object-side surface being concave, wherein the object-side surface and an image-side surface of the fourth lens element are both aspheric;
    wherein the photographing lens system further comprises an aperture stop and there is an air gap between every two of the four lens elements that are adjacent to each other, a curvature radius of the object-side surface of the first lens element is R1, a curvature radius of an image-side surface of the first lens element is R2, a curvature radius of the image-side surface of the third lens element is R6, a curvature radius of the object-side surface of the fourth lens element is R7, an axial distance between the aperture stop and the image-side surface of the fourth lens element is SD, an axial distance between the object-side surface of the first lens element and the image-side surface of the fourth lens element is TD, and the following conditions are satisfied:

$$-1.0<(R6+R7)/(R6-R7)<1.0;$$

$$0.75<SD/TD<1.20; \text{ and}$$

$$-1.50<(R1+R2)/(R1-R2)\leq-0.86.$$

2. The photographing lens system of claim 1, wherein the fourth lens element has the image-side surface being concave.

3. The photographing lens system of claim 1, wherein at least one surface of the fourth lens element has at least one inflection point.

4. The photographing lens system of claim 1, wherein the four lens elements of the photographing lens system are made of plastic materials, an Abbe number of the second lens element is V2, and the following condition is satisfied:

$$V2<27.0.$$

5. The photographing lens system of claim 1, wherein the following condition is satisfied:

$$0.80<SD/TD<0.95.$$

6. The photographing lens system of claim 1, wherein the following condition is satisfied:

$$-0.80<(R6+R7)/(R6-R7)<0.80.$$

7. The photographing lens system of claim 1, wherein a curvature radius of an object-side surface of the second lens element is R3, a curvature radius of the image-side surface of the second lens element is R4, and the following condition is satisfied:

$0.58 \leq (R3-R4)/(R3+R4) < 0.65$.

8. The photographing lens system of claim 1, wherein an axial distance between the first lens element and the second lens element is T12, an axial distance between the second lens element and the third lens element is T23, an axial distance between the third lens element and the fourth lens element is T34, and the following condition is satisfied:

$0 < T34/(T12+T23) < 1.0$.

9. The photographing lens system of claim 1, wherein an absolute value of the curvature radius of an object-side surface of the second lens element is greater than an absolute value of a curvature radius of the object-side surface of the third lens element.

10. A photographing lens system comprising four lens elements, the four lens elements being, in order from an object side to an image side:
   a first lens element with positive refractive power having an object-side surface being convex and an image-side surface being concave;
   a second lens element with negative refractive power having an image-side surface being concave;
   a third lens element having an image-side surface being concave, wherein an object-side surface and the image-side surface of the third lens element are both aspheric, and at least one surface of the third lens element has at least one inflection point; and
   a fourth lens element with negative refractive power having an object-side surface being concave, wherein the object-side surface and an image-side surface of the fourth lens element are both aspheric;
   wherein the photographing lens system further comprises an aperture stop; an absolute value of a curvature radius of the image-side surface of the first lens element is greater than an absolute value of a curvature radius of the object-side surface of the third lens element, there is an air gap between every two of the four lens elements that are adjacent to each other, a curvature radius of the image-side surface of the third lens element is R6, a curvature radius of the object-side surface of the fourth lens element is R7, an axial distance between the aperture stop and the image-side surface of the fourth lens element is SD, an axial distance between the object-side surface of the first lens element and the image-side surface of the fourth lens element is TD, and the following conditions are satisfied:

$-1.0 < (R6+R7)/(R6-R7) < 1.0$; and $0.75 < SD/TD < 1.20$.

11. The photographing lens system of claim 10, wherein the fourth lens element has the image-side surface being concave.

12. The photographing lens system of claim 10, wherein at least one surface of the second lens element has at least one inflection point.

13. The photographing lens system of claim 10, wherein at least one surface of the fourth lens element has at least one inflection point.

14. The photographing lens system of claim 10, wherein the four lens elements of the photographing lens system are made of plastic materials, the following condition is satisfied:

$0.80 < SD/TD < 0.95$.

15. The photographing lens system of claim 10, wherein an Abbe number of the second lens element is V2, and the following condition is satisfied:

$V2 < 27.0$.

16. The photographing lens system of claim 15, wherein the following condition is satisfied:

$V2 \leq 21.4$.

17. The photographing lens system of claim 10, wherein the curvature radius of the image-side surface of the third lens element is R6, the curvature radius of the object-side surface of the fourth lens element is R7, and the following condition is satisfied:

$-0.80 < (R6+R7)/(R6-R7) < 0.80$.

18. The photographing lens system of claim 10, wherein an axial distance between the third lens element and the fourth lens element is T34, a central thickness of the fourth lens element is CT4, and the following condition is satisfied:

$0 < T34/CT4 < 2.0$.

19. The photographing lens system of claim 10, wherein no lens elements are disposed between the aperture stop and the first lens element.

20. The photographing lens system of claim 10, wherein a central thickness of the fourth lens element is greater than a central thickness of the third lens element.

21. The photographing lens system of claim 10, wherein an absolute value of a curvature radius of an object-side surface of the second lens element is greater than the absolute value of the curvature radius of the object-side surface of the third lens element.

22. An image capturing device comprising:
   the photographing lens system of claim 10; and
   an image sensor.

23. An electronic device comprising:
   the image capturing device of claim 22.

* * * * *